Patented Oct. 27, 1942

2,300,196

UNITED STATES PATENT OFFICE 2,300,196

MANUFACTURE OF SELENIUM RED PIGMENTS

Abe R. Bozarth, Cleveland, Ohio, assignor to The Harshaw Chemical Company, Elyria, Ohio, a corporation of Ohio No Drawing. Application May 10, 1940, Serial No. 334,424

8 Claims. (Cl. 106—301)

This invention relates to the preparation of selenium red pigments and has for its object to provide a method of calcining which will result in pigments of superior brilliance and strength and by means of which more nearly unifrom results can be attained in production from batch to batch.

By the term "selenium red pigments" is to be understood those which consist essentially of cadmium, sulfur and selenium. The state of combination of these elements is not known with certainty. They may also contain indifferent materials, fillers, diluents and modifying elements. The commonest pigments of this type are (1) the so-called C. P. cadmium reds or selenium reds which are made by calcining together CdS and Se, or CdS and a selenium compound, or a suitable cadmium compound with selenium or a selenium compound, and (2) the cadmopone-selenium pigments which are usually prepared by precipitating a cadmopone (BaSO₄—CdS) and calcining the same with selenium or a selenium compound. The batches of crude pigment or pulp, ready for calcination, are known as "greencake." The literature discloses various methods of preparing green cake and various green cake compositions. There is a difference of opinion as to what composition and what method of preparation is best, however, it is not necessary to discuss this question since the present invention relates primarily to a method of calcination of green cake and only secondarily to the preparation of the green cake itself. That is, the present invention is concerned with the composition of the green cake only insofar as it affects conditions of calcination.

It has been known for many years that the atmosphere in the kiln, or other container in which calcination is carried out, profoundly affects the color characteristics of selenium-containing compositions. The effect on selenium compositions of oxidizing and reducing agents in the batch and of calcining in oxidizing, reducing and neutral kiln atmospheres has been quite thoroughly investigated in the glass industry. Selenium has been used extensively for decolorizing glass and in the production of colored glass. A review of the technological factors involved in the use of selenium for decolorizing glass appeared in the Journal of the Society of Glass Technology for March 1935, beginning at page 43. A similar review appeared in Glass Industry for September 1935, pages 283 to 287. From these reviews, it would appear that the early workers whose work was there reviewed were in agreement that strongly oxidizing conditions should be avoided either in the batch or in the kiln atmosphere. Most of the workers considered reducing conditions desirable; some preferred neutral or slightly oxidizing conditions. Similar conclusions were reached by makers of ruby glass. Glass Industry 9, 152 (1938); Am. Cer. Soc. Abs. 7, 669.

In the manufacture of selenium red pigments or cadmium red pigments, the experience has been the same. Sugie, in Jour. Soc. Chem. Ind. XXIV, 252, (1921), described the preparation of a selenium red from a mixture of 80 to 90 per cent of CdS and 10 to 20 per cent of selenium. Budgeon, in the April 1927 issue of Continental Metallurgical and Chemical Engineering, commenting on Sugie's work, states that the finely powdered components were mixed and heated in a clay crucible in a muffle furnace at 700° C., that a blue flame burns at the mouth of the crucible and that the product is quenched when the blue flame is nearly extinguished. The procedure of quenching before the blue flame was extinguished undoubtedly was necessary to prevent access of air to the highly heated pigment, however, it is objectionable in that it limits the time of calcination to the period during which sulfur fumes are being given off in substantial volume. I have found it desirable to calcine for a period of from ½ to 3 hours or even longer beyond the period of copious gas evolution. It is also known that heating in air will injure the color of cadmium sulfide pigments.

I have now discovered that not only must strongly oxidizing atmospheres be avoided in the calcination of selenium red pigments but that a particular kind of atmosphere is most desirable, viz., as nearly as practically attainable an atmosphere of selenium vapor. I obtain such an atmosphere and maintain it by the use of the process now to be described. Less desirable but distinctly beneficial results can be had by maintaining an atmosphere of sulfur vapor or a mixture of the vapors of sulfur and selenium.

In the practice of the invention, I employ a closed, externally heated kiln or container provided with means whereby it can be vented. Preferably this kiln takes the form of a rotary retort having external heating means, closed at one end and provided with a door at the other end. The door preferably is provided with a small vent opening which also may be provided with closing means.

The substantially dry green cake, containing in addition to the ingredients which are expected to go into the formation of the finished pigment, a quantity of elemental selenium sufficient to produce the desired selenium vapor atmosphere, is placed in the kiln. As the temperature is raised, water vapor and other gases are evolved depending upon the constitution of the batch. During the initial stages of heating at least, the container is vented. The evolution of water vapor displaces the air, the evolution of sulfur fumes or sulfurous gases then displaces the steam and finally the selenium vapor displaces the sulfur, $SO_2$ or the like. The evolution of gases soon ceases or becomes reduced to a small volume. At this stage, the vent may be closed, but it need not be, if the vent opening is relatively small or if the venting arrangement is such that ingress of air and substantial loss of the selenium vapor is prevented. A single small vent at one end of the container or kiln is very satisfactory. The kiln temperature should be from 500° C. to 700° C. If just the right amount of excess selenium is added to the batch, the loss of selenium vapor through the vent will be small. The proper amount will depend upon the size of the batch, the rate of heating, the uniformity of application of heat to the parts of the batch and the size and characteristics of the kiln. Hence, it is impossible to state the amount of excess selenium required for best results. If too much selenium is used, no great harm is done and excessive loss of selenium through the vent will be obvious in any setup and can be readily corrected. After the calcination is complete, the pigment is quenched. Preferably during the removal of the pigment from the kiln and transfer to the quenching medium, air is excluded. However, air need not be entirely excluded, and very satisfactory results can be had if the kiln charge is merely dumped quickly into water. No more than 10 seconds, preferably not more than 5 seconds, should be consumed if the hot pigment is transferred through air to the quenching medium. If air is excluded, the time element is less important.

As stated above, the present invention is not primarily concerned with the constitution of the batch and various well known methods of making the green cake may be used following known recipes.

*Example I*

Following, with modifications, the method of Sugie, cited above, a mixture of 80 to 90 per cent of CdS with 10 to 20 per cent of selenium may be calcined to a maximum of about 700° C. in the above described kiln. The 80%–20% ratio is preferable and will provide adequate selenium for the creation of the selenium vapor atmosphere. The vent may be left open throughout the calcination or, after the proportion of selenium has been adjusted to the particular conditions so that very little is lost through the vent, the vent may be closed after the evolution of gases other than selenium vapor has slowed down. By this variation of Sugie's method, it becomes possible to continue the calcination for as long as desirable and quenching at the end of the copious evolution of the flame producing gases to avoid ingress of air is not necessary. The air is excluded just as in the case of Sugie's process but the calcination is continued in the favorable selenium atmosphere until the pigment is fully developed. The pigment is then quenched substantially without exposure to air.

*Example II*

Following, with modifications, the process of German Patent No. 337,992 (1921), 100 parts CdS may be heated with 60 parts CdSe, but 5 to 10 parts of Se should be added for the creation of the selenium vapor atmosphere. Heating, venting and quenching may be as in Example I.

*Example III*

My process is well adapted to the production of cadmium reds or selenium reds containing diluents or fillers. It is applicable, for instance, to production of the cadmopone selenium pigments. A whole series of such pigments is described on page 12 of the Journal of the Oil and Colour Chemists Association for January 1927. To take one specific pigment from the series there described, which will be adequate to illustrate the application of the present invention, I may mix solutions of BaS and BaSe and react with such solutions a suitable quantity of cadmium sulfate, the proportions of reactants being suitable to produce $4(CdS, CdSE)7BaSO_4$. To the resulting precipitate, before or after the precipitation may be added e. g. 5% of elemental selenium. The resulting green cake is calcined in accordance with the procedure of Example I.

In any of the foregoing examples, instead of providing an atmosphere of selenium vapor, I may partly or wholly replace the selenium vapor atmosphere with an atmosphere of sulfur vapor, however, selenium vapor is preferable. Sulfur vapor may be produced by adding free sulfur to the batch. In practice a certain amount of sulfurous gases will be evolved throughout the calcination, accordingly there can never be a pure selenium atmosphere and this limitation on the term, selenium atmosphere, is to be understood.

Having thus described my invention, what I claim is:

1. Process of preparing a selenium red pigment including the steps of preparing a green cake capable of yielding such pigment, heating such green cake in a closed container, venting such container at least until the initial atmosphere and any water vapor have been displaced, and maintaining in said container during the remainder of the calcination at atmosphere of selenium vapor while preventing ingress of substantial quantities of air.

2. In the process of claim 2, the additional step of quenching the resulting pigment without substantial exposure to air.

3. The invention defined in claim 2, further characterized in that the batch also contains $BaSO_4$.

4. The invention defined in claim 2, further characterized in that said container is vented throughout the calcination step.

5. The invention defined in claim 2, further characterized in that said container is vented during an initial stage of the calcination characterized by copious evolution of vapors and is thereafter closed during a succeeding stage of the calcination.

6. Process of preparing a selenium red pigment including the steps of preparing a green cake capable of yielding such pigment and containing excess selenium, heating such green cake in a closed container while venting such container at least until the initial copious evolution of gases has subsided and continuing to heat said green cake for a period of one-half hour or more at temperatures from 500° C. to 700° C. while maintaining in said container an atmosphere of selenium vapor and preventing ingress of air.

7. Process of preparing a selenium red pigment including the steps of preparing a green cake capable of yielding such pigment and containing elemental selenium, heating such green cake in a closed container while venting such container at least until the initial air and any evolved water vapor have been displaced and the initial copious evolution of sulfurous vapors has largely subsided and continuing to heat such green cake at from 500° C. to 700° C., until the color is fully developed, while maintaining in said container an atmosphere of selenium vapor and preventing ingress of air.

8. Process of preparing a selenium red pigment including the steps of preparing a green cake capable of yielding such pigment and containing elemental selenium, heating such green cake in a closed container while venting such container at least until the initial air and any evolved water vapor have been displaced and the initial copious evolution of sulfurous vapors has largely subsided and continuing to heat such green cake for at least one-half hour at from 500° C. to 700° C., until the color is fully developed, while maintaining in said container an atmosphere of selenium vapor and preventing ingress of air.

ABE R. BOZARTH.

CERTIFICATE OF CORRECTION.

Patent No. 2,300,196.　　　　　　　　　　　　　October 27, 1942.

ABE R. BOZARTH.

It is hereby certified that error appears in the printed specification of the above numbered patent requiring correction as follows: Page 2, second column, line 24, for "CdSE" read --CdSe--; line 50, claim 1, for "at" read --an--; lines 53, 56, 59 and 62, claims 2 to 5 inclusive, for "claim 2" read --claim 1--; and that the said Letters Patent should be read with this correction therein that the same may conform to the record of the case in the Patent Office.

Signed and sealed this 22nd day of December, A. D. 1942.

(Seal)

Henry Van Arsdale,
Acting Commissioner of Patents.